United States Patent
Huang

(10) Patent No.: US 7,458,388 B2
(45) Date of Patent: Dec. 2, 2008

(54) FREEZE SAFE VALVE

(76) Inventor: Chung Yi Huang, No. 510, Liautsu Lane, Liautsu Li, Lugan, Changhua Hsien 50565 (TW)

( * ) Notice: Subject to any disclaimer, the term of this patent is extended or adjusted under 35 U.S.C. 154(b) by 378 days.

(21) Appl. No.: 11/405,869

(22) Filed: Apr. 18, 2006

(65) Prior Publication Data

US 2007/0240764 A1    Oct. 18, 2007

(51) Int. Cl.
*E03C 1/10* (2006.01)
(52) U.S. Cl. .................. 137/218; 137/107; 137/859
(58) Field of Classification Search ............... 137/107, 137/217, 218, 859
See application file for complete search history.

(56) References Cited

U.S. PATENT DOCUMENTS

| | | | | |
|---|---|---|---|---|
| 3,171,423 A | * | 3/1965 | Dillon | 137/218 |
| 3,850,190 A | * | 11/1974 | Carlson | 137/218 |
| 4,296,770 A | | 10/1981 | Rice | 137/62 |
| 4,484,594 A | | 11/1984 | Alderman | 137/62 |
| 4,522,219 A | | 6/1985 | Ohkata | 137/62 |
| 4,909,270 A | * | 3/1990 | Enterante et al. | 137/107 |
| 5,388,615 A | * | 2/1995 | Edlund et al. | 137/859 |
| 6,857,446 B1 | * | 2/2005 | Hoeptner, III | 137/218 |
| 2005/0178434 A1 | * | 8/2005 | Yang | 137/218 |

* cited by examiner

*Primary Examiner*—John Rivell
*Assistant Examiner*—Craig M Schneider
(74) *Attorney, Agent, or Firm*—Charles E. Baxley

(57) ABSTRACT

A freeze safe valve includes a housing coupled between an upstream tube and a downstream tube of a water flowing or supplying line for shutting off the water flowing or supplying line and for opening a drain port in response to the formation of ice on the downstream side of water flowing or supplying line, and thus for alleviating the pressure on the downstream side and for precluding or eliminating water damage from frozen, broken pipes, etc. A flexible valve member is disposed in the housing for selectively blocking the drain port of the housing by the fluid flowing into the housing and for selectively blocking the an orifice of a plate by a spring member.

10 Claims, 4 Drawing Sheets

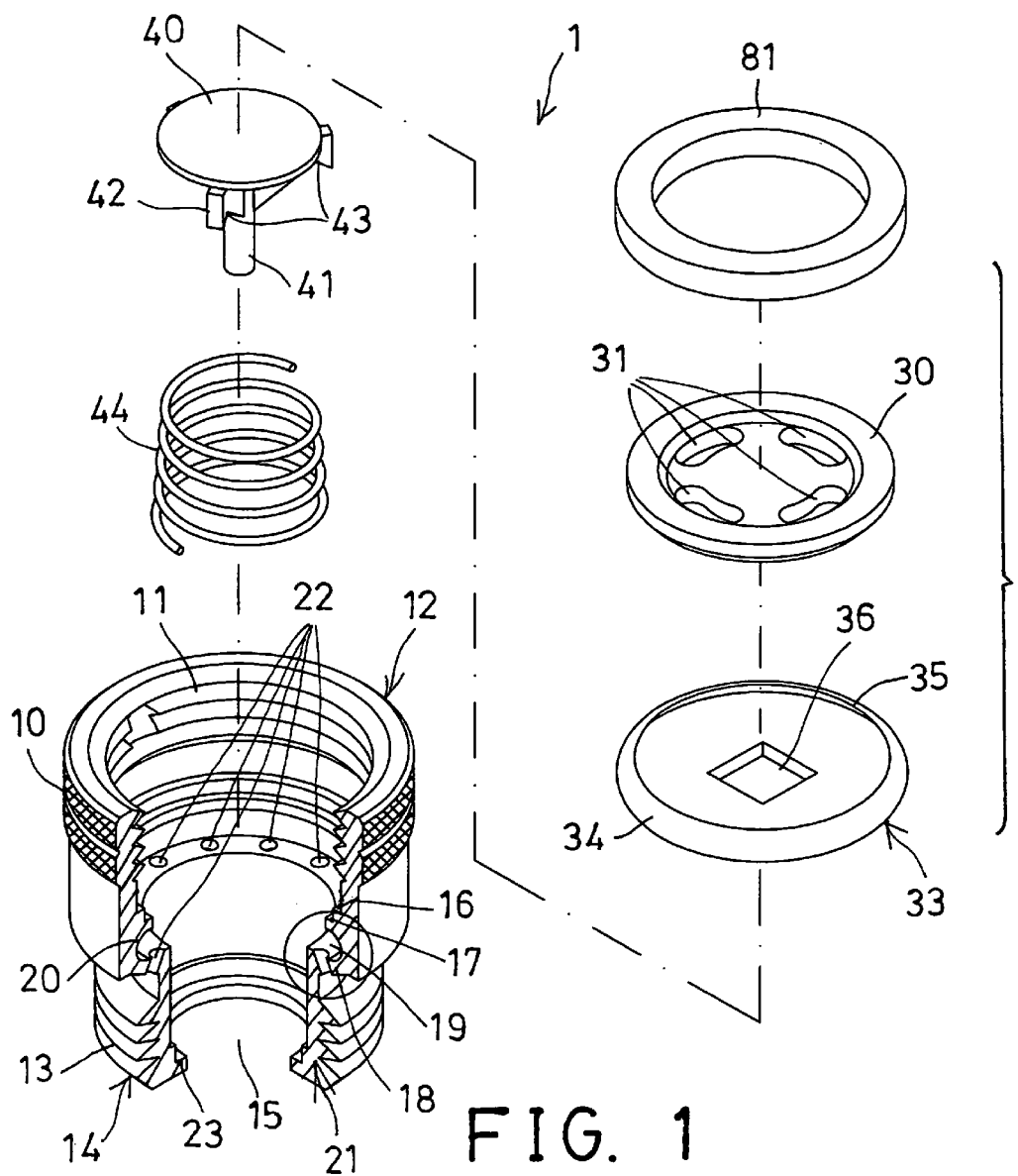
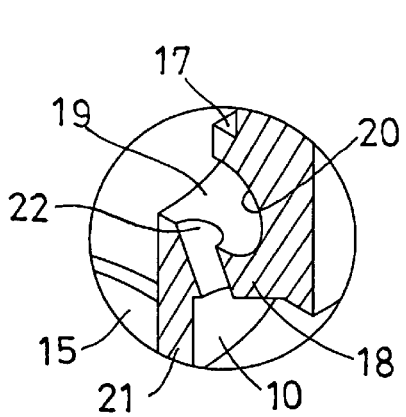
FIG. 2
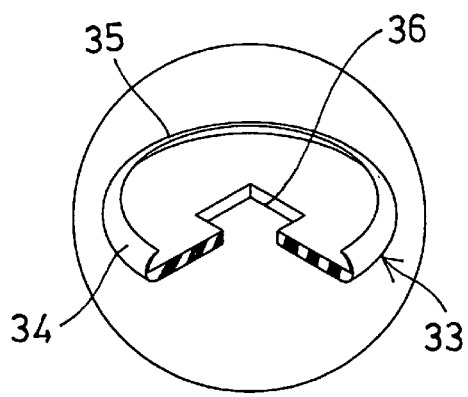
FIG. 3

FREEZE SAFE VALVE

BACKGROUND OF THE INVENTION

1. Field of the Invention

The present invention relates to a freeze safe valve, and more particularly to a freeze safe valve for installing in a water flowing or supplying line and for shutting off the water flowing or supplying line and for opening a drain port in response to the formation of ice on the downstream side of water flowing or supplying line, and thus for alleviating the pressure on the downstream side and for precluding or eliminating water damage from frozen, broken pipes, etc.

2. Description of the Prior Art

Typical freeze guard or drain or preventing valves are provided or designed for installing in a water flowing or supplying line and for shutting off the water flowing or supplying line and for opening a drain port in response to the formation of ice on the downstream side of water flowing or supplying line, and thus for alleviating the pressure on the downstream side and for precluding or eliminating water damage from frozen, broken pipes.

The typical freeze guard or drain or preventing valves comprise a spring-biased valve member slidably disposed in a valve housing, and arranged in the water flowing or supplying line for draining the water flowing or supplying line to prevent freeze up damage.

For example, U.S. Pat. No. 4,296,770 to Rice discloses one of the typical freeze guard or drain or preventing valves comprising a temperature responsive thermal actuator mounted to the housing adjacent fluid inlet passageways, a poppet valve member biased to engage with a valve seat, and a flexible bead chain connected between the valve member and the cage arrangement. However, Rice discloses a complicated configuration that may not be easily manufactured and marketed.

U.S. Pat. No. 4,484,594 to Alderman discloses another typical freeze guard or drain or preventing valve comprising an apertured retainer plate and a bellows assembly disposed in a cylindrical housing, the bellows is initially charged to an expanded condition with a fluid which contracts as the temperature approaches the freezing temperature of water, for preventing freeze damage caused by water freezing in water pipes in the home or other location. However, it will be difficult to charge or to fill and to maintain the fluid in the bellows.

U.S. Pat. No. 4,522,219 to Ohkata discloses a further typical freeze guard or drain or preventing valve comprising a valve member disposed in a housing and having a collar for engaging with two spring members which may actuate the valve member to engage with a valve seat, and to open an exhaust port for pressure relieving purposes or for alleviating the pressure on the downstream side of a water supply line and for precluding breakage of the downstream side of the water supply line.

However, the collar of the valve member may not be effectively operated or actuated by the water flowing into the valve device, and the pressure in the downstream side of the water supply line may not be effectively relieved.

The present invention has arisen to mitigate and/or obviate the afore-described disadvantages of the conventional freeze guard or drain or preventing valves.

SUMMARY OF THE INVENTION

The primary objective of the present invention is to provide a freeze safe valve for installing in a water flowing or supplying line and for shutting off the water flowing or supplying line and for opening a drain port in response to the formation of ice on the downstream side of water flowing or supplying line, and thus for alleviating the pressure on the downstream side and for precluding or eliminating water damage from frozen, broken pipes, etc.

In accordance with one aspect of the invention, there is provided a freeze safe valve comprising a housing including a first end and a second end for being coupled to an upstream tube and a downstream tube, and including a chamber formed therein, and including at least one drain port formed therein for communicating the chamber of the housing with an outer environment of the housing, a plate disposed in the chamber of the housing and including at least one orifice formed therein for guiding a fluid to flow through the chamber of the housing and to flow from the first end of the housing toward the second end of the housing, a flexible valve member disposed in the housing for engaging with the housing and for being selectively forced to block the drain port of the housing by the fluid flowing into the chamber of the housing and flowing through the orifice of the plate, the flexible valve member including a bore formed therein for allowing the fluid to flow through the flexible valve member and to the second end of the housing, the bore of the flexible valve member being offset from the orifice of the plate for allowing the orifice of the plate to be selectively blocked by the flexible valve member, and offset from the drain port of the housing for allowing the drain port of the housing to be selectively blocked by the flexible valve member, and a forcing device provided for forcing the flexible valve member to selectively engage with the plate and to selectively block the orifice of the plate when no fluid is supplied into the first end of the housing, and to selectively engage with the housing and to selectively block the drain port of the housing when the fluid is supplied into the first end of the housing and forced against the flexible valve member.

The housing includes an inner peripheral groove formed therein for receiving and retaining the flexible valve member. The housing includes a curved inner peripheral surface formed therein for defining the inner peripheral groove thereof. The flexible valve member includes a curved outer peripheral surface formed thereon for engaging with the curved inner peripheral surface of the housing.

The housing includes a peripheral rib extended into the chamber of the housing for forming the inner peripheral groove of the housing, the drain port of the housing is formed in the peripheral rib of the housing.

The flexible valve member includes a peripheral lip extended therefrom for engaging with the housing and for spacing the flexible valve member from the plate and for selectively opening the orifice of the plate when the fluid is supplied into the first end of the housing and forced against the flexible valve member.

The forcing device includes an actuator slidably disposed in the chamber of the housing, and a spring member engaged with the actuator for biasing and forcing the actuator to engage with the flexible valve member and to force the flexible valve member toward and against the plate and to block the orifice of the plate when no fluid is supplied into the first end of the housing.

The actuator includes a rod extended therefrom. The housing includes a peripheral flange extended into the chamber of the housing for engaging with and for anchoring the spring member.

The actuator includes at least one flap for engaging with the housing and for erecting the actuator relative to the housing and for guiding the actuator to move toward and away from the flexible valve member. The flap of the actuator includes at least one depression formed therein for engaging with the spring member and for anchoring the spring member to the actuator.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is an exploded view of a freeze safe valve in accordance with the present invention;

FIG. 2 is an enlarged partial perspective view of the freeze safe valve, having a portion of the outer housing cut for showing an inner structure of the outer housing;

FIG. 3 is another enlarged partial perspective view illustrating a flexible valve member of the freeze safe valve, having a portion of the flexible valve member cut for showing an inner structure of the flexible valve member of the outer housing;

DETAILED DESCRIPTION OF THE PREFERRED EMBODIMENT

Figure 4:
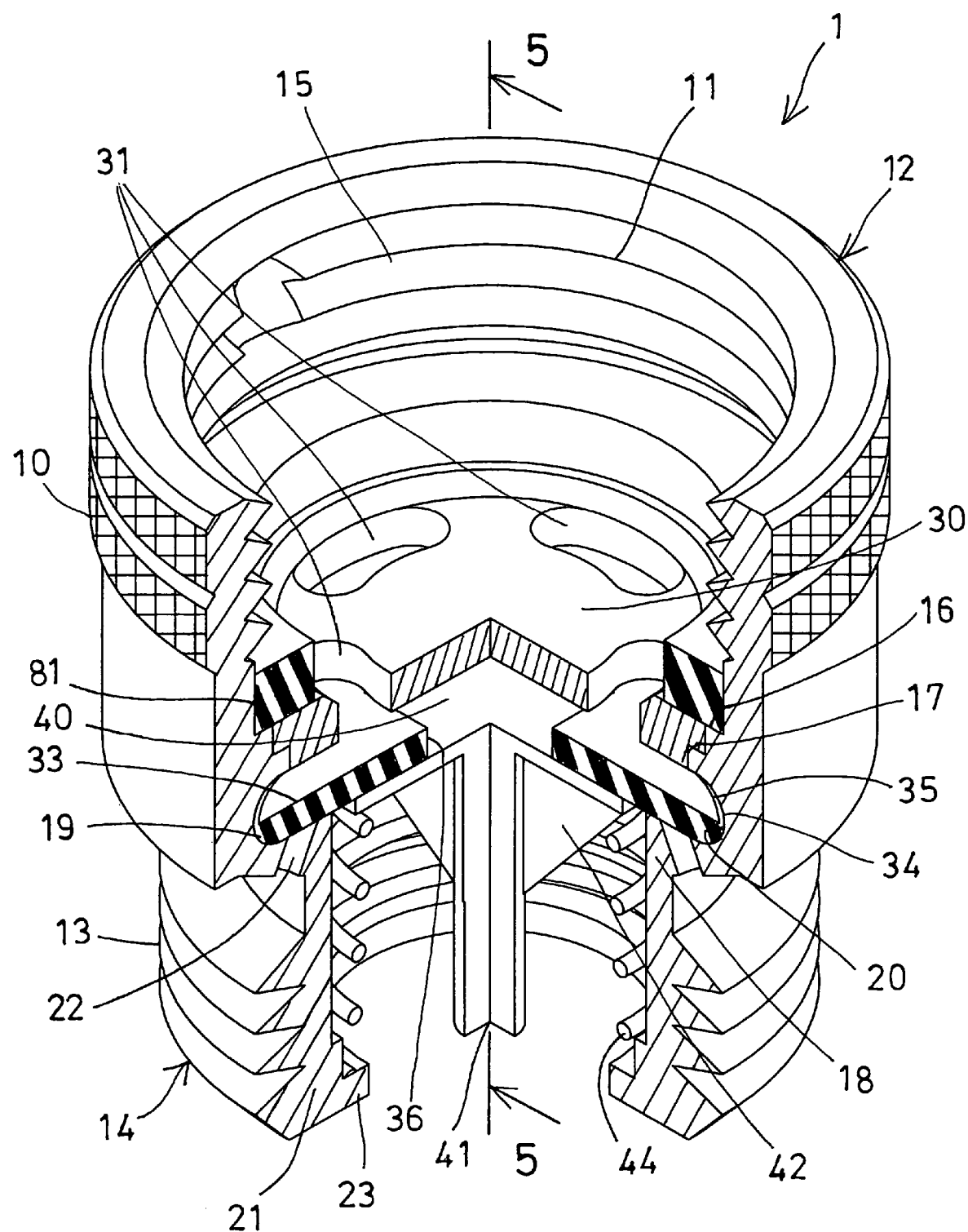
FIG. 4 is a perspective view of the freeze safe valve in which a portion of the outer housing has also been cut for showing the inner structure of the outer housing.

Referring to the drawings, and initially to FIGS. 1-5, a freeze safe valve 1 in accordance with the present invention comprises an outer housing 10 for being coupled to or installed in a fluid or water flowing or supplying line 8 (FIGS. 5, 6), such as mounted in an intermediate portion of the water flowing or supplying line 8 or arranged between an upstream side or tube 80 and a downstream side or tube 88, for shutting off the water flowing or supplying line 8 and for opening a drain port in response to the formation of ice on the downstream tube 88 of water flowing or supplying line 8, and thus for alleviating the pressure on the downstream tube 88 and for precluding or eliminating water damage from frozen, broken pipes, etc.

For example, the housing 10 includes an outer or inner thread 11 formed in one end portion 12 thereof for threading or coupling or securing to the upstream tube 80, and an inner or outer thread 13 formed in the other end portion 14 thereof for threading or coupling or securing to the downstream tube 88 and thus for coupling or installing the housing 10 in the water flowing or supplying line 8 and between the upstream tube 80 and the downstream tube 88. It is preferable that one or more sealing rings 81 may be installed in the housing 10 and engaged with the tubes 80, 88, particularly the upstream tube 80 for making a water tight seal between the tubes 80, 88 and the housing 10.

The housing 10 includes a chamber 15 formed therein and includes an inner peripheral shoulder 16 formed therein for engaging with the sealing ring 81 and for stably supporting and anchoring or retaining the sealing ring 81 in the chamber 15 of the housing 10. The housing 10 may further include another inner peripheral shoulder 17 formed therein for engaging with a plate 30 that is disposed or engaged in the chamber 15 of the housing 10, and the plate 30 includes one or more orifices 31 formed therein for guiding or limiting the fluid or water to flow through the chamber 15 of the housing 10 or to flow from the upstream tube 80 to or through the downstream tube 88. For example, the inner peripheral shoulder 17 is formed and located below the other inner peripheral shoulder 16 of the housing 10.

The housing 10 further includes a peripheral rib 18 extended into the chamber 15 of the housing 10 from such as a middle portion of the housing 10, and preferably located below the inner peripheral shoulders 16, 17 of the housing 10, for forming or defining an inner peripheral groove 19 in the housing 10 which is formed or defined by a curved inner peripheral surface 20. The housing 10 includes a cylindrical barrel 21 extended downwardly from the radially inner portion of the peripheral rib 18, and having the inner or outer thread 13 formed thereon, and having a diameter, particularly an outer diameter smaller than that of the housing 10.

The housing 10 further includes one or more passages or drain ports 22 formed therein, such as formed in the peripheral rib 18 or in the middle portion of the housing 10 and communicating with the inner peripheral groove 19 and the chamber 15 of the housing 10 for opening the chamber 15 of the housing 10 or for communicating the chamber 15 of the housing 10 with the outer atmosphere or the outer environment of the housing 10. A flexible valve member 33 is disposed or engaged and retained in the inner peripheral groove 19 of the housing 10 and is made of soft or flexible or resilient or spring materials for engaging onto the peripheral rib 18 and for selectively blocking the drain ports 22 of the housing 10 (FIGS. 4-6) and thus for allowing the fluid or water or air to selectively flow into and out of the chamber 15 of the housing 10 via the drain ports 22 of the housing 10.

It is preferable that the plate 30 is disposed between the flexible valve member 33 and the upstream tube 80 or the end portion 12 of the housing 10, and the flexible valve member 33 is disposed closer to the downstream tube 88 or the other end portion 14 of the housing 10, and includes a curved outer peripheral surface 34 formed thereon for engaging with the curved inner peripheral surface 20 of the housing 10 and thus for stably retaining the flexible valve member 33 in the inner peripheral groove 19 of the housing 10, and the flexible valve member 33 further includes a peripheral skirt or lip 35 provided or extended upwardly therefrom for engaging with the housing 10 and for slightly spacing the flexible valve member 33 from the plate 30 (FIGS. 4, 5), and thus for opening the orifices 31 of the plate 30 and thus for allowing the fluid or water or air to selectively flow through the orifices 31 of the plate 30.

The peripheral skirt or lip 35 of the flexible valve member 33 is arranged for allowing the flexible valve member 33 to be biased or forced or moved upwardly to selectively engage with the plate 30 (FIG. 6) and to selectively block the orifices 31 of the plate 30 and thus to prevent the fluid or water or air from flowing backwardly into the upstream tube 80 via the orifices 31 of the plate 30. The flexible valve member 33 includes a bore 36, such as a rectangular bore 36 formed therein, such as formed in the center portion thereof for allowing the fluid to flow through the flexible valve member 33 and to the other end portion 14 of the housing 10, and the bore 36 of the flexible valve member 33 is offset from the orifices 31 of the plate 30 for allowing the orifices 31 of the plate 30 to be selectively blocked by the flexible valve member 33 (FIG. 6). The bore 36 of the flexible valve member 33 is also offset from the drain ports 22 of the housing 10 for allowing the drain ports 22 of the housing 10 to be selectively blocked by the flexible valve member 33 (FIGS. 4, 5).

A pusher or moving device or actuator 40 is slidably disposed in the chamber 15 of the housing 10 and located below the flexible valve member 33 and includes an outer diameter smaller than that of the housing 10, particularly smaller than the inner diameter of the cylindrical barrel 21 of the housing 10, for preventing the chamber 15 of the housing 10 from being blocked by the actuator 40. It is preferable that the actuator 40 includes a rod 41 extended downwardly therefrom, and includes one or more flaps 42 extended outwardly from the rod 41 for engaging with the inner peripheral portion of the cylindrical barrel 21 of the housing 10, and for erecting the actuator 40 relative to the cylindrical barrel 21 of the housing 10, and for guiding the actuator 40 to move toward and away from the flexible valve member 33 (FIGS. 5, 6).

It is preferable that the flaps 42 of the actuator 40 each include a depression 43 formed therein for engaging with and for anchoring or positioning a forcing or spring biasing means or member 44 which may bias and force the actuator 40 to move toward and to force against the flexible valve member 33 (FIG. 6) in order to force the flexible valve member 33 to engage with the plate 30 and to selectively block the orifices 31 of the plate 30. The housing 10 may include an inner peripheral flange 23 extended inwardly from the lower or bottom portion of the cylindrical barrel 21 of the housing 10 for engaging with and for anchoring or positioning the spring member 44 and for allowing the flexible valve member 33 to be selectively forced by the actuator 40 to block the orifices 31 of the plate 30.

Figure 5:
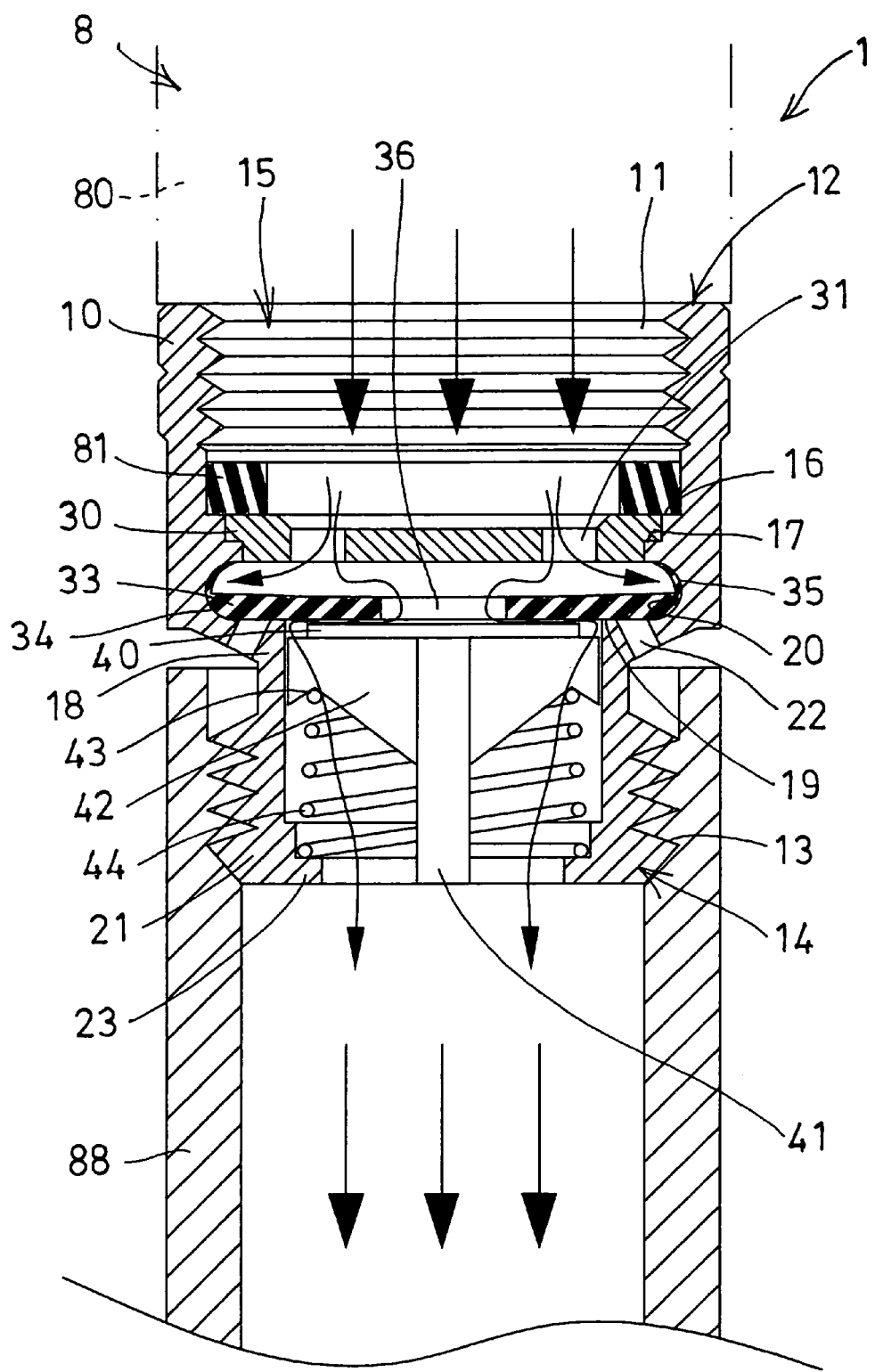
FIG. 5 is a cross sectional view of the freeze safe valve, taken along lines 5-5 of FIG. 4.
Figure 6:
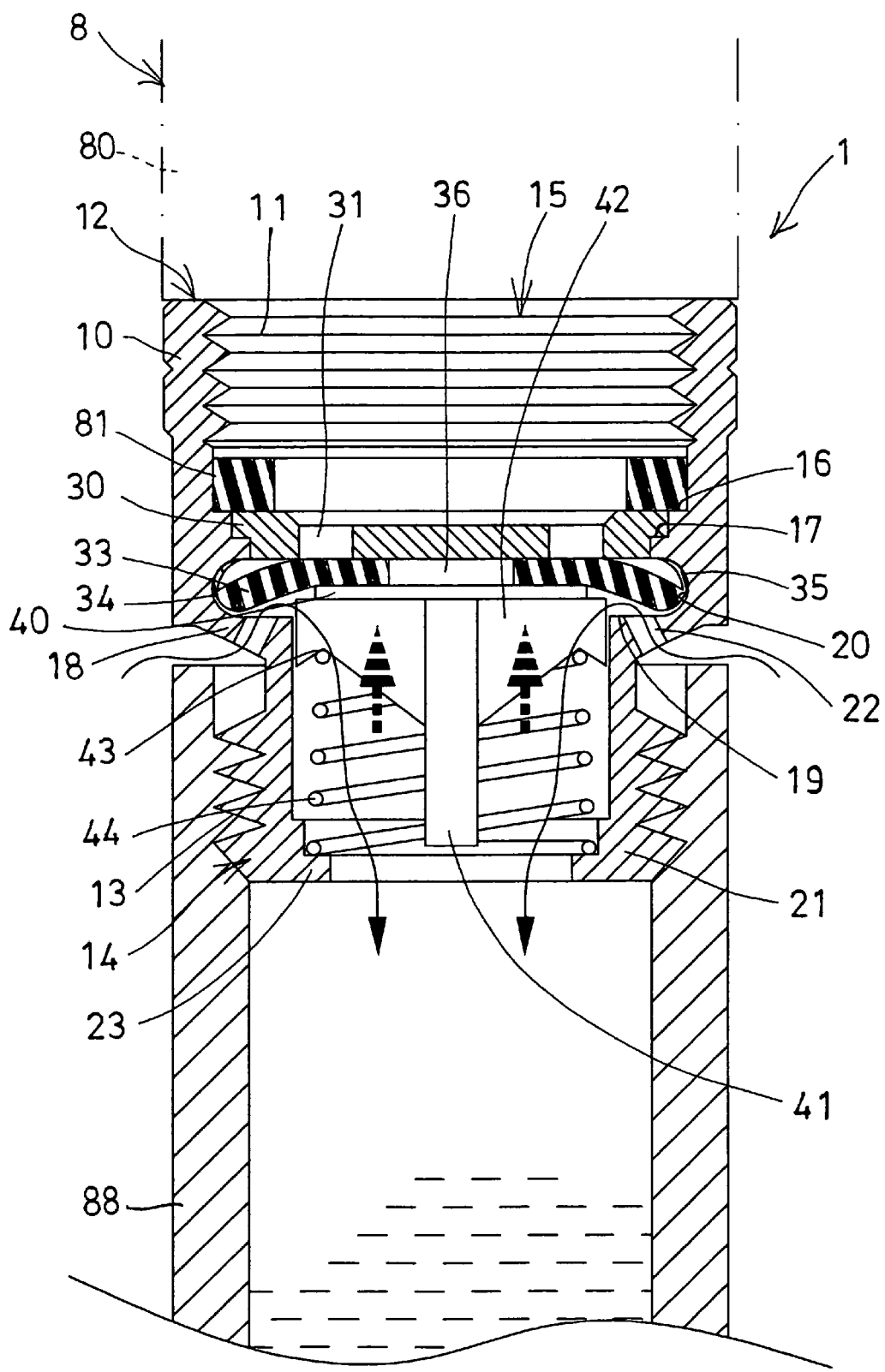
FIG. 6 is a cross sectional view similar to FIG. 5, illustrating the operation of the freeze safe valve.

In operation, as shown in FIG. 5, when a fluid or water is supplied from the upstream tube 80 of the water flowing or supplying line 8, the water may flow through the orifices 31 of the plate 30 and may apply a water pressure force against the flexible valve member 33 in order to force the flexible valve member 33 against the peripheral rib 18 or the housing 10 and so as to block the drain ports 22 of the housing 10. At this moment, the fluid or water or air is allowed to flow through the bore 36 of the flexible valve member 33, and may apply a fluid pressure force against the actuator 40 and the spring member 44, in order to force the actuator 40 away from the flexible valve member 33, and to allow the fluid or water or air to flow out of the chamber 15 of the housing 10 and then to flow into the downstream tube 88.

As shown in FIG. 6, when no fluid or water is supplied from or into the upstream tube 80 of the water flowing or supplying line 8, no pressure force may be applied against the flexible valve member 33, at this moment, the actuator 40 and the spring member 44 may apply a spring biasing force against the flexible valve member 33 and may force the flexible valve member 33 against the plate 30 in order to block the orifices 31 of the plate 30. At this moment, the flexible valve member 33 may also be forced and moved away from the peripheral rib 18 or the housing 10 in order to open the drain ports 22 of the housing 10, and thus to open or to release the downstream tube 88, and thus to allow the fluid or water or air to flow into and out of the downstream tube 88.

Particularly, when in winter season or during the freezing days, the fluid or water contained in the downstream tube 88 may be frozen to form ice in the downstream tube 88 and may include a greatly increased volume which may increase the pressure in the downstream tube 88 and may thus breaking the downstream tube 88. The opening or relieving of the drain ports 22 of the housing 10 allows the fluid or water or air to flow into and out of the downstream tube 88, and thus to avoid or to preclude or to eliminate the water damage from frozen, broken pipes, etc.

It is to be noted that the flexible valve member 33 may either be forced to block the drain ports 22 of the housing 10 by the water pressure force applied from the upstream tube 80 of the water flowing or supplying line 8, or be forced to block the orifices 31 of the plate 30 by the spring biasing force applied from the actuator 40 and the spring member 44, and may simultaneously open the drain ports 22 of the housing 10 and thus to open or to release the downstream tube 88, such that the freeze safe valve includes a specially designed flexible valve member 33 to control the fluid flowing from the upstream tube 80 to the downstream tube 88 and also to selectively release the downstream tube 88.

Accordingly, the freeze safe valve in accordance with the present invention may be provided for shutting off the water flowing or supplying line and for opening the drain port in response to the formation of ice on the downstream side of water flowing or supplying line, and thus for alleviating the pressure on the downstream side and for precluding or eliminating water damage from frozen, broken pipes, etc.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A freeze safe valve comprising:

a housing including a first end and a second end for being coupled to an upstream tube and a downstream tube, and including a chamber formed therein, and including at least one drain port formed therein for communicating said chamber of said housing with an outer environment of said housing, a plate disposed in said chamber of said housing and including at least one orifice formed therein for guiding a fluid to flow through said chamber of said housing and to flow from said first end of said housing toward said second end of said housing, a flexible valve member disposed in said housing for engaging with said housing and for being selectively forced to block said at least one drain port of said housing by the fluid flowing into said chamber of said housing and flowing through said at least one orifice of said plate, said flexible valve member including a bore formed therein for allowing the fluid to flow through said flexible valve member and to said second end of said housing, said bore of said flexible valve member being offset from said at least one orifice of said plate for allowing said at least one orifice of said plate to be selectively blocked by said flexible valve member, and offset from said at least one drain port of said housing for allowing said at least one drain port of said housing to be selectively blocked by said flexible valve member, and said flexible valve member including a peripheral lip extended therefrom for engaging with said housing and for spacing said flexible valve member from said plate, and said flexible valve member being further operated for selectively opening said at least one orifice of said plate when the fluid is supplied into said first end of said housing and forced against said flexible valve member, and means for forcing said flexible valve member to selectively engage with said plate and to selectively block said at least one orifice of said plate when no fluid is supplied into said first end of said housing, and to selectively engage with said housing and to selectively block said at least one drain port of said housing when the fluid is supplied into said first end of said housing and forced against said flexible valve member.

2. The freeze safe valve as claimed in claim 1, wherein said housing includes an inner peripheral groove formed therein for receiving and retaining said flexible valve member.

3. The freeze safe valve as claimed in claim 2, wherein said housing includes a curved inner peripheral surface formed therein for defining said inner peripheral groove thereof.

4. The freeze safe valve as claimed in claim 3, wherein said flexible valve member includes a curved outer peripheral surface formed thereon for engaging with said curved inner peripheral surface of said housing.

5. The freeze safe valve as claimed in claim 2, wherein said housing includes a peripheral rib extended into said chamber of said housing for forming said inner peripheral groove of said housing, said at least one drain port of said housing is formed in said peripheral rib of said housing.

6. The freeze safe valve as claimed in claim 1, wherein said forcing means includes an actuator slidably disposed in said chamber of said housing, and a spring member engaged with said actuator for biasing and forcing said actuator to engage with said flexible valve member and to force said flexible valve member toward and against said plate and to block said at least one orifice of said plate when no fluid is supplied into said first end of said housing.

7. The freeze safe valve as claimed in claim 6, wherein said actuator includes a rod extended therefrom.

8. The freeze safe valve as claimed in claim 6, wherein said actuator includes at least one flap for engaging with said housing and for erecting said actuator relative to said housing and for guiding said actuator to move toward and away from said flexible valve member.

9. The freeze safe valve as claimed in claim 8, wherein said at least one flap of said actuator includes at least one depression formed therein for engaging with said spring member and for anchoring said spring member to said actuator.

10. The freeze safe valve as claimed in claim 6, wherein said housing includes a peripheral flange extended into said chamber of said housing for engaging with and for anchoring said spring member.

* * * * *